United States Patent [19]

Szpakowski

[11] 3,760,195

[45] Sept. 18, 1973

[54] TRIGGER COMPARATOR CIRCUIT

[75] Inventor: Bronislaw Tadeusz Szpakowski, Kanta, Ontario KOA 2CO, Canada

[73] Assignee: Bell Canada-Northern Electric Research Limited, Ottawa, Ontario, Canada

[22] Filed: Aug. 28, 1972

[21] Appl. No.: 284,148

[52] U.S. Cl. .................................. 307/235, 328/146

[51] Int. Cl. .............................................. H03k 5/20

[58] Field of Search .................... 307/231, 235, 290; 328/146, 148

[56] References Cited

UNITED STATES PATENTS

| | | | |
|---|---|---|---|
| 2,939,018 | 5/1960 | Faulkner | 307/290 X |
| 3,513,353 | 5/1970 | Lansch | 307/235 X |
| 3,569,739 | 3/1971 | Stolman | 307/235 R |
| 3,612,912 | 10/1971 | Schwartz | 307/290 |
| 3,721,834 | 3/1973 | Hirschfeld | 307/235 R |

OTHER PUBLICATIONS

"Voltage Monitor" – IBM Tech. Disclosure Bulletin, Vol. 12, No. 10, Mar. 1970, pages 1680–1681.

"Comparator and A-C Coupling Provide D-C Transformer Action" by Carmody, Electronics, Vol. 43, No. 12, June 8, 1970, page 98.

*Primary Examiner*—Stanley D. Miller, Jr.
*Attorney*—Alfred A. DeLuca

[57] ABSTRACT

A trigger comparator circuit having an operational amplifier which compares a reference voltage with a sample of a source voltage developed across a second portion of a first voltage divider. When the source voltage increases beyond a predetermined level a corresponding signal is generated at the output terminal of the operational amplifier which begins to drive a transistor switch into conduction. The transistor switch in turn channels current through a first portion of the first voltage divider so as to increase the voltage level appearing at the second portion of the first voltage divider until the transistor switch is driven into saturation.

13 Claims, 2 Drawing Figures

TRIGGER COMPARATOR CIRCUIT

FIELD OF THE INVENTION

This invention relates to fast acting comparator circuits capable of generating rectangular output pulses from time varying non-rectangular input signal voltages. More particularly this invention relates to a trigger comparator circuit which features fast and exact triggering, with controllable and predictable hysteresis, from one output voltage level to another in response to a predetermined change in input signal voltage.

DESCRIPTION OF THE PRIOR ART

It is highly desirable in many applications to sense voltage variations above and below a predetermined voltage level and to generate a digital output signal in response to variations about said voltage level. One well known circuit which is almost universally used because of its simplicity and operational stability is the Schmidt trigger. Although the Schmidt trigger is probably best known in its classical schematic circuit form, which uses a pair of emitter coupled transistors, newer circuit forms incorporating integrated circuit amplifiers may be seen in the RCA Linear Integrated Circuit Handbook, Series 1C–41 at pages 114, 129 and 147.

In many current trigger circuits hysteresis is dependent on the trigger or threshold level of the trigger circuit while the triggering or threshold level in turn is dependent on the value of the operating or supply voltage. Furthermore component tolerances between apparently identical circuits can give rise to widely differing trigger levels.

SUMMARY OF THE INVENTION

It has been found that an operational amplifier may be used in combination with passive circuit elements to form a new trigger comparator circuit configuration exhibiting fast and consistent triggering over a wide range of supply voltages, and a hysteresis which is predictable and substantially independent of threshold level. Furthermore as the operational amplifier operates as a differential amplifier the triggering level depends primarily on the voltage difference between the applied input signal voltage and a reference voltage, and hysteresis but not on the supply voltage.

Thus in accordance with the present invention the trigger comparator for sensing voltage level variations at a voltage source comprises an operational amplifier having a first differential input terminal, a second differential input terminal and an output terminal. The trigger comparator further comprises a first voltage divider means having a first, a second and a third resistance means, serially connected and arranged for connection across the voltage source. The junction of the first and second resistance means being provided with means for connection to a source of reference voltage and the junction of the second and third resistance means being connected to the second differential input terminal of the operational amplifier. In addition, the trigger comparator further comprises a switch means having first and second switch terminal and a switch control terminal. The switch control terminal is connected to the output terminal of the operational amplifier, the first switch terminal is connected to the junction of the first and second resistance means, and the second switch terminal is arranged for connection to a source of working voltage.

In response to an increase in the voltage level or voltage magnitude at a voltage source (increasing positively for a positive voltage source or increasing negatively for a negative voltage source) a corresponding voltage level increase appears at the output terminal of the operational amplifier to turn "ON" the switch means and channel current supplied by the source of working voltage through the junction of the first and second resistance means. Accordingly the potential at the junction of the second and third resistance means changes to support the increase in the voltage level at the voltage source in locking the switch means "ON" until the absolute voltage level at the voltage source returns to its quiescent value.

BRIEF DESCRIPTION OF THE DRAWINGS

Example embodiments of the invention will now be described with reference to the accompanying drawings in which.

DESCRIPTION OF A FIRST EMBODIMENT OF THE INVENTION

Figure 1:
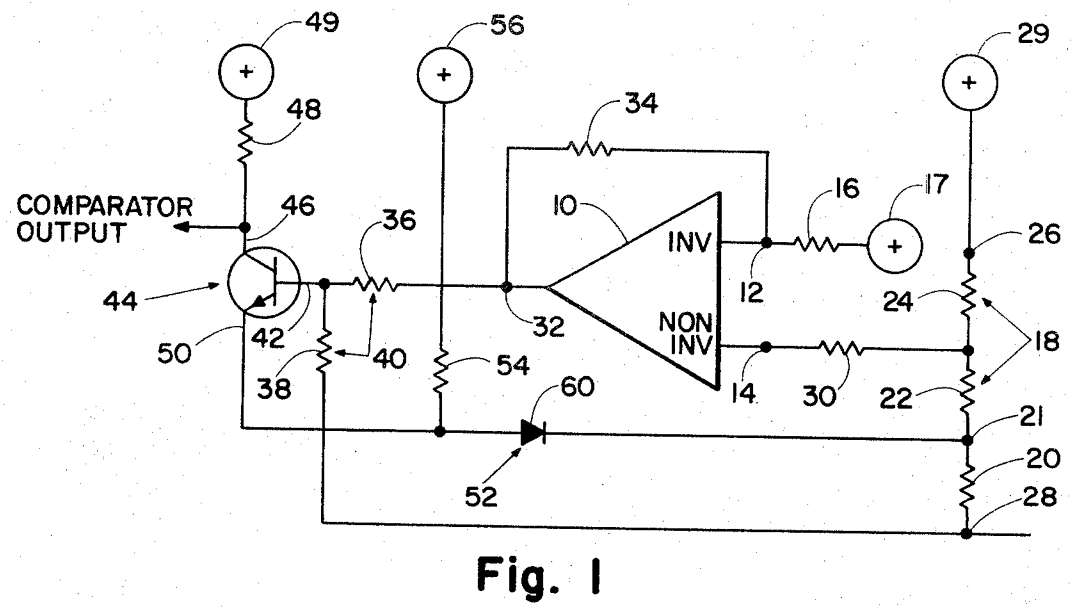
FIG. 1 is a schematic drawing of one embodiment of the invention.

With reference to FIG. 1 the trigger comparator comprises an operational amplifier 10 having a first differential or inverting input terminal 12 and a second differential or non-inverting input terminal 14. The inverting input terminal 12 is connected through a first input resistor 16 to a source of reference voltage 17. A first voltage divider 18, formed by serially connecting a first resistor 20, a second resistor 22 and a third resistor 24, is connected via its first 26 and second 28 outer terminals to a voltage source 29. A second input resistor 30 connects the non-inverting input 14 of the operational amplifier 10 to the junction of the second 22 and third 24 resistors which is also referred to as the second tap terminal. The fraction of the first voltage divider 18 comprising the first resistor 20 being referred to as the first tapped portion and the fraction of the voltage divider 18 comprising the first 20 and second 22 resistors being referred to as the second tapped portion.

A feedback resistor 34 connects the inverting input terminal 12 to the output terminal 32 of the operational amplifier 10 in accordance with normal operational amplifier practice. A fourth resistor 36 and fifth resistor 38 form a second voltage divider 40 between the output terminal 32 of the operational amplifier 10 and the second outer terminal 28 of the first voltage divider 18.

A transistor switch 44 is connected via its base or switch control terminal 42, to the second voltage divider 40 at the junction of the fourth 36 and fifth 38 resistors. The collector or second switch terminal 46 of the transistor switch 44 is connected through a collector load resistor 48 to a source of working voltage 49 while the emitter or first switch terminal 50 of said switch 44 is connected via a first bias diode 52 to the first voltage divider 18 at the first divider tap terminal which is at the junction of the first 20 and second 22 resistors. To provide a suitable forward bias for the first bias diode 52, the emitter 50 of the transistor switch 44 is connected via a sixth or bias resistor 54 to a source of bias voltage 56. In the foregoing circuit description to the voltage source 29, the source of reference voltage 17, the bias voltage 56, and the source of working voltage 49 have a common terminal connected to the second terminal 28 of the first voltage divider 18.

In the embodiment illustrated in FIG. 1, the negative terminal of each of the aforementioned voltages is connected to the second outer terminal 28 of the first voltage divider 18, and the anode 60 of the first bias diode 52 is connected to the emitter 50 of the transistor switch 44. If the trigger comparator circuit of FIG. 1 is to be used with source, reference, working and bias voltages of opposite polarity to the polarity shown in FIG. 1, the transistor switch 44 is replaced by a pnp device and the first bias diode 52 is poled in a reverse direction.

OPERATION OF THE FIRST EMBODIMENT OF THE INVENTION

In the operation of the embodiment illustrated in FIG. 1, the sensed or source voltage 29 is applied to the first voltage divider 18 at the first outer terminal 26 and a suitable source of reference voltage 17 is connected via a first input resistor 16 to the inverting input 12 of the operational amplifier 10. The ratio of the first 20, second 22 and third 24 resistors and the magnitude of the reference voltage 17 are chosen to achieve the desired voltage level at which the source voltage will trigger the trigger comparator circuit. The fourth 36 and fifth 38 resistors of the second voltage divider 40 are chosen to suitably attenuate the signal voltage level appearing at the output terminal 32 of the operational amplifier 10 prior to applying said signal voltage to the base of the transistor switch 44, and the first bias diode 52 is used to suitably bias the emitter 50 of the transistor switch 44 relative to the voltage appearing at the junction of the first 20 and second 22 resistors of the first divider network 18. The bias resistor 54 supplies a suitably forward bias for the first bias diode 52 from the bias voltage 56. When a change in voltage level occurs at the voltage source 29 a corresponding change in voltage level appears at the non-inverting input terminal 14 of the operational amplifier 10 which creates a voltage differential between the voltages appearing at the inverting 12 and non-inverting 14 input terminals of said operational amplifier 10. Depending on the gain of the operational amplifier 10 a voltage signal corresponding to said differential voltage or error voltage appears at the output terminal 32 of the operational amplifier 10. The second voltage divider 40 divides said voltage signal and connects said voltage signal to the base 42 of the transistor switch 44. If the change in voltage level is sufficient and is a result of an increase in voltage level (with respect to FIG. 1 the voltage source rising positively) the voltage signal at the output terminal 32 of the operational amplifier 10 will rise and, drive the transistor switch 44 into conduction. Once the transistor switch 44 begins to conduct, current from the working voltage 49 will flow through collector resistor 48, the collector emitter junction of the transistor switch 44, the first bias diode 52, and the first resistor 20 to the second outer terminal 28, of the first voltage divider 18. This flow of current through the transistor switch 44 will raise the potential at the junction of the first 20 and second 22 resistors and as a result will also raise the potential at the junction of the second 22 and third 24 resistors. It can be seen, therefore, that a positive current feedback situation exists as a voltage rise at the non-inverting input terminal 14, due to a rise at the voltage source 29, is reinforced by a flow of current through the first resistor 20 from the working voltage 49.

If the trigger comparator is designed to monitor a negative voltage, the transistor switch 44 is replaced by a pnp device, and the first diode 52 as well as all operating potentials are reversed. As the negative voltage rises at the first outer terminal 26 of the first voltage divider 18, a negative signal voltage level is generated at the output terminal 32 of the operational amplifier 10 to drive the transistor switch 44 into conduction. As the transistor switch 44 conducts the potential at the first and second tapped terminals increases negatively and locks the trigger comparator in its "ON" state until the negative voltage at the first outer terminal 26 decreases as required.

DESCRIPTION OF A SECOND EMBODIMENT OF THE INVENTION

In the circuit of FIG. 1 the trigger comparator output is taken from the collector 46 of the transistor switch 44. Depending on the loading effect of circuitry which may be connected to the collector 46 or second switch terminal of the transistor switch 44 a certain amount of variation in the hysteresis pattern of the trigger comparator may be observed.

Figure 2:
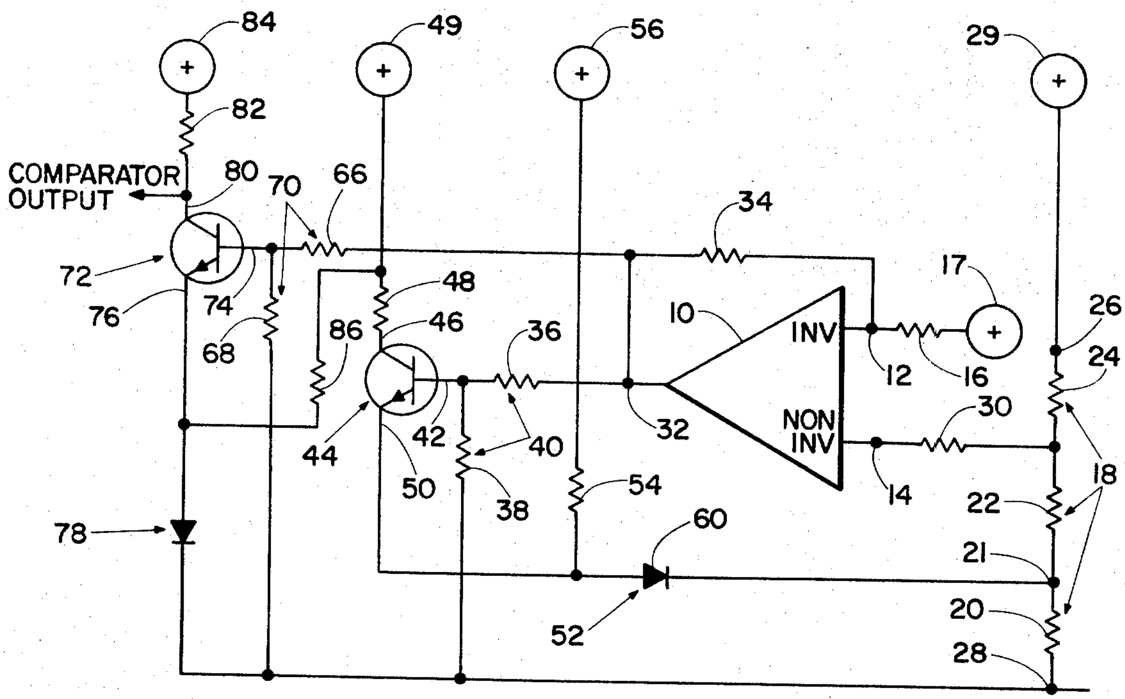
FIG. 2 is a schematic drawing of a variation of the embodiment illustrated in FIG. 1.

In order to make the hysteresis pattern of the trigger comparator as independent as possible of loading effects caused by associated circuitry, the circuit variation illustrated in FIG. 2 has evolved. As a comparison of FIGS. 1 and 2 will quickly reveal the close similarity of these two circuits only the circuit differences will be described.

With reference to FIGS. 1 and 2 the modified trigger comparator circuit illustrated in FIG. 2 further comprises a seventh 66 and eighth 68 resistor serially connected to form a third voltage divider 70 which is connected between the output terminal 32 of the operational amplifier 10 and the first voltage divider 18 at the second outer terminal 28. An output transistor 72 is connected via its base 74 to the junction of the seventh 66 and eighth 68 resistors. The emitter 76 of the output transistor 72 is connected via a second bias diode 78 to the first voltage divider 18 at the second outer terminal 28, while the collector 80 of said transistor 72 is connected via a collector load resistor 82 to a suitable source of output current 84. To suitably forward bias the second bias diode 78 in order that the output transistor 72 will switch sharply into and out of conduction a ninth resistor 86 is connected from the emitter 76 of the output transistor 72 to the source of working voltage 49 or alternatively from said emitter 76 to the bias voltage 56. The source of output current 84 is preferably separate from the source of working voltage 49 if loading effects on the trigger comparator circuit are to be minimized. The hysteresis may be changed within limits by changing the value of collector resistor 48 or changing the magnitude of the working voltage 49. If the hysteresis is to be changed by changing the magnitude of the working voltage 49 the ninth resistor 86 should be connected to the bias voltage 56 in lieu of the working voltage 49.

OPERATION OF THE SECOND EMBODIMENT OF THE INVENTION

In view of the circuit similarities between FIGS. 1 and 2 the operation of the circuit illustrated in FIG. 2 will be described in terms of the differences in operation between both circuits when; the voltage source 29, the source of reference voltage 17, the bias voltage 56, the source of working voltage 49 and the source of output current, are positive as illustrated in FIG. 2.

When the signal voltage level appearing at the output terminal 32 of the operational amplifier 10 swings sufficiently positively to turn "ON" the transistor switch 44, (and supply suitable positive current feedback to the first voltage divider 18), a corresponding signal appears at the base 74 of the output transistor 72. This signal which is supplied to the base 74 of the output transistor 72 from the junction of the seventh 66 and eighth 68 resistors of the third voltage divider 70, overcomes the output transistor 72 bias established by the second bias diode 78 and turns "ON" said output transistor 72. Unlike the circuit of FIG. 1 the trigger comparator output in the circuit of FIG. 2 is taken from the collector 80 of the output transistor 72, which is powered from a separate source of output current 84 in order to minimize loading effects on the hysteresis pattern of triggering voltages. The source of output current 84 will usually be derived from a control terminal of external circuitry.

Because the emitter 76 of the output transistor 72 is connected through the second bias diode 78 directly to the first voltage divider 18 at the second outer terminal, and not through the first resistor 20 as is the emitter 50 of the transistor switch 44, a further degree of isolation between input and output is achieved by using the trigger comparator circuit of FIG. 2.

Although the structural and operational descriptions of the circuits of FIGS. 1 and 2 have been limited to positive applied potentials and npn transistors it is understood that said circuits may be used with pnp transistors, and reverse poled diodes on circuit applications where negative potentials are encountered.

What is claimed is:

1. A trigger comparator for sensing voltage level variations in a voltage source, said comparator comprising:

a. an operational amplifier having a first differential input terminal, a second differential input terminal, and an output terminal;

b. a voltage divider means having a first and second outer terminal for connection to the voltage source, a first tap terminal and the second outer terminal defining a first tapped portion, and a second tap terminal and the second outer terminal defining a second tapped portion, the second tapped portion being greater in resistance than the first tapped portion;

c. means for connecting the second differential input terminal of the operational amplifier to the second tap terminal;

d. means for connecting the first differential input terminal of the operational amplifier to a source of reference voltage;

e. switch means, having a first switch terminal connected to the first tap terminal, a switch control terminal connected to the output terminal of the operational amplifier; and a second switch terminal for connection to a source of working voltage;

whereby in response to an increase in the voltage magnitude at the voltage source the switch means establishes a connection between the first and second tap terminals to channel current supplied by the source of working voltage through the first tapped portion of the voltage divider thereby increasing the voltage magnitude at the second tap terminal and holding the switch means in its conducting state until a decrease in voltage magnitude at the voltage source.

2. A trigger comparator for sensing voltage level variations from a normal voltage level at a voltage source, said comparator comprising:

a. an operational amplifier having a first differential input terminal, a second differential input terminal and an output terminal;

b. a first voltage divider means, the first voltage divider means having first, second and third resistance means serially connected and arranged for connection across the voltage source, the junction of the first and second resistance means defining a first divider tap terminal, and the junction of the second and third resistance means defining a second divider tap terminal;

c. means for connecting the first differential input terminal of the operational amplifier to a source of reference voltage;

d. means for connecting the second differential input terminal of the operational amplifier to the second divider tap termianl;

e. switch means, having a switch control terminal connected to the output terminal of the operational amplifier, a first switch terminal connected to the first divider tap terminal, and a second switch terminal for connection to a source of working voltage;

whereby in response to an increase in the voltage level at the voltage source, a corresponding voltage level increase appears at the output terminal of the operational amplifier to turn "ON" the switch means and to channel current supplied by the source of working voltage through the first divider tap terminal, thereby changing the potential at the second divider tap terminal to support said increase in voltage level in locking the switch means "ON" until the voltage level at the voltage source returns to normal.

3. A trigger comparator for sensing variations in the voltage level of a voltage source, said comparator comprising:

a. an operational amplifier having an inverting input terminal, a non-inverting input terminal and an output terminal;

b. a first voltage divider means having first, second and third resistors serially connected and arranged for connection across the voltage source, the junction of the second and third resistors being connected to the non-inverting input terminal of the operational amplifier;

c. means for connecting the inverting input terminal of the operational amplifier to a source of reference voltage;

d. a transistor switch, the base of said switch being connected to the output terminal of the operational amplifier, the emitter of said switch being connected to the junction of the first and second resistors and the collector of said switch arranged for connection to a source of working voltage;

whereby in response to an increase in the voltage level at the voltage source, a corresponding voltage level increase at the output terminal of the operational amplifier turns "ON" the transistor switch and channels current supplied by the source of working voltage to the junction of the first and second resistors thereby raising the voltage level at the non-inverting input terminal of the operational amplifier so as to lock the transistor switch "ON" until a decrease in voltage level at the voltage source.

4. The invention as defined in claim 3 wherein the emitter of the transistor switch is connected to the junction of the first and second resistors through a first bias diode poled in the same direction as the emitter base junction of said transistor switch.

5. The invention as claimed in claim 3 further comprising a fourth and fifth resistor serially connected and arranged to form a second voltage divider between the output terminal of the operational amplifier and the voltage source at the first resistor, the base of the transistor switch being connected to the junction of the fourth and fifth resistors.

6. The invention as claimed in claim 4 further comprising a fourth and fifth resistor serially connected and arranged to form a second voltage divider between the output terminal of the operational amplifier and the voltage source at the first resistor, the base of the transistor switch being connected to the junction of the fourth and fifth resistors.

7. The invention as defined in claim 4 further comprising means to forward bias the first bias diode.

8. The invention as defined in claim 7 wherein the means to forward bias the first bias diode comprises a sixth resistor having one end connected to the emitter of the transistor switch and the other end arranged for connection to a source of bias voltage.

9. The invention as defined in claim 4 wherein the transistor switch includes an npn transistor and the emitter of said transistor is connected to the anode of said diode.

10. The invention as defined in claim 4 wherein the transistor switch includes a pnp transistor and the emitter of said transistor is connected to the cathode of said diode.

11. The invention as defined in claim 3 wherein the voltage source, the reference voltage and the source of working voltage have a common terminal connected to the first resistor.

12. The invention as defined in claim 8 wherein the voltage source, the reference voltage, the source of working voltage and the source of bias voltage have a common terminal connected to the first resistor.

13. The invention as defined in claim 6 further comprising:

a. a seventh and eighth resistor serially connected and arranged to form a third voltage divider between the output terminal of the operational amplifier and the voltage source at the first resistor;

b. an output transistor, having its base connected to the junction of the seventh and eighth resistors and its collector arranged for connection to a source of output current, c. a second bias diode, poled in the same direction as the emitter base junction of the output transistor, connecting the emitter of the output transistor to the voltage source at the first resistor, d. a ninth resistor having one end connected to the emitter of the output transistor and the other end arranged for connection to the source of working voltage.

* * * * *